US012362927B2

(12) United States Patent
Marco et al.

(10) Patent No.: US 12,362,927 B2
(45) Date of Patent: Jul. 15, 2025

(54) CONFIGURING DISCONNECTED DEVICES USING PREDEFINED NETWORK CONFIGURATION

(71) Applicant: RubyComm Ltd, RaAnana (IL)

(72) Inventors: Shlomi Raz Marco, Alfei Menashe (IL); Yinon Feldheim, Herzliya (IL); Yaacov Fenster, Petach-Tikva (IL); Aviad Marco, Alfei Menashe (IL); Eric Goldberg, Rehovot (IL)

(73) Assignee: RubyComm Ltd, RaAnana (IL)

( * ) Notice: Subject to any disclaimer, the term of this patent is extended or adjusted under 35 U.S.C. 154(b) by 211 days.

(21) Appl. No.: 18/195,978

(22) Filed: May 11, 2023

(65) Prior Publication Data

US 2024/0380582 A1  Nov. 14, 2024

(51) Int. Cl.
*H04L 9/08* (2006.01)
*G06F 8/65* (2018.01)

(52) U.S. Cl.
CPC ............ *H04L 9/0866* (2013.01); *G06F 8/65* (2013.01); *H04L 9/0863* (2013.01)

(58) Field of Classification Search
CPC ........ H04L 9/0866; H04L 9/0863; G06F 8/65
See application file for complete search history.

(56) References Cited

U.S. PATENT DOCUMENTS

| 9,141,321 B1* | 9/2015 | Poppenga | G06F 3/1203 |
| 11,960,875 B2* | 4/2024 | Harata | G06F 8/65 |
| 2006/0085404 A1* | 4/2006 | Kusunoki | G06F 8/65 |
| 2007/0299940 A1* | 12/2007 | Gbadegesin | G06F 8/65 709/217 |
| 2008/0130639 A1* | 6/2008 | Costa-Requena | G06F 8/65 370/389 |
| 2008/0313282 A1* | 12/2008 | Warila | G06F 8/65 717/172 |
| 2014/0075567 A1* | 3/2014 | Raleigh | H04M 15/00 726/26 |
| 2014/0173578 A1* | 6/2014 | Ku | G06F 8/65 717/169 |
| 2017/0118023 A1* | 4/2017 | Gussen | G06F 8/65 |
| 2018/0285088 A1* | 10/2018 | Lancioni | G06F 8/65 |
| 2021/0397437 A1* | 12/2021 | Kohvakka | G06F 8/65 |
| 2022/0181012 A1* | 6/2022 | Skelton | G06F 8/654 |
| 2022/0217526 A1* | 7/2022 | Zheng | H04W 8/183 |
| 2024/0070277 A1* | 2/2024 | Ge | G06F 21/602 |
| 2024/0345825 A1* | 10/2024 | Kouge | G06F 8/65 |
| 2024/0354088 A1* | 10/2024 | Gifre | G06F 8/61 |
| 2025/0021324 A1* | 1/2025 | Fan | G06F 8/65 |

* cited by examiner

*Primary Examiner* — Richard G Keehn

(57) ABSTRACT

Disclosed herein is a method of distributing data to target devices using predefined network configuration, comprising broadcasting one or more predefined network identifiers via one or more networks accessible to one or more target devices, the one or more predefined network identifiers identify the access device in the network(s), receiving a connection request from one or more of the target devices to join the network(s) according to the predefined network identifier(s), establishing a communication session with the target device(s) via the network(s), receiving one or more update requests for one or more update packages from one or more of the target devices, and transmitting, responsive to determination that the update package(s) is available to the access device, the update packages to the target device(s) which is adapted to apply the one or more of the received update packages.

22 Claims, 4 Drawing Sheets

CONFIGURING DISCONNECTED DEVICES USING PREDEFINED NETWORK CONFIGURATION

BACKGROUND

The present invention relates, in some embodiments thereof, to configuring and/or updating devices not connected to networks and, more specifically, but not exclusively, to using predefined network configuration parameters for configuring and/or updating devices which are typically disconnected from the network.

The use and deployment of smart devices having computing capabilities, for example, control units, sensors, Internet of Things (IoT) devices, smart appliances, network equipment, and/or the like is rapidly growing and spreading to practically any aspect of modern life ranging from home and office applications, through agriculture, industrial, traffic, auto and other segments to public order and defense uses.

In order to effectively adapt and carry out their assigned tasks, missions, applications, and/or operations, such devices may need to update in their configuration, operation modes, software, firmware, hardware, and/or the like. In particular, such devices may need to be updated post deployment and/or before initial use, i.e., after deployed in the field for their assigned tasks.

These devices may therefore include network connectivity allowing them to connect to one or more network nodes to check for available updates and receive them if available.

SUMMARY

An objective of the embodiments of the disclosure is to provide a solution for configuring and/or updating devices post deployment (before or after initial setup) which mitigates or solves the drawbacks and problems of conventional solutions. The above and further objectives are solved by the subject matter of the independent claims. Further advantageous embodiments can be found in the dependent claims.

According to a first aspect of the present invention there is provided a method of distributing data to target devices using predefined network configuration, comprising using one or more processors of an access device for:

Broadcasting one or more predefined network identifiers via one or more networks accessible to one or more target devices. The one or more predefined network identifiers identify the access device in the one or more networks.

Receiving a connection request from one or more of the target devices to join the one or more networks according to one or more of the predefined network identifiers.

Establishing a communication session with one or more of the target devices via one or more of the networks.

Receiving one or more update requests for one or more update packages from one or more of the target devices.

Transmitting, responsive to determination that one or more of the update packages are available at the access device, one or more of the update packages to one or more of the target devices which are adapted to apply the one or more of the received update packages.

According to a second aspect of the present invention there is provided an access device for distributing data to target devices using predefined network configuration, comprising one or more network interfaces for connecting to one or more networks, and one or more processors adapted to execute a code. The code comprising:

Code instructions to broadcast one or more predefined network identifiers via one or more networks accessible to one or more target devices. The one or more predefined network identifiers identify the access device in the one or more networks.

Code instructions to receive a connection request from one or more of the target devices to join the one or more networks according to one or more of the predefined network identifiers.

Code instructions to establish a communication session with one or more of the target devices via one or more of the networks.

Code instructions to receive one or more update requests for one or more update packages from one or more of the target devices.

Code instructions to transmit, responsive to determination that one or more of the update packages are available at the access device, one or more of the update packages to one or more of the target devices which are adapted to apply the one or more of the received update packages.

According to a third aspect of the present invention there is provided a method of downloading data from an access device using predefined network configuration, comprising using one or more processors of a target device for:

Probing one or more networks for one or more predefined network identifiers associated with one or more access devices.

Transmitting, responsive to detection of one or more of the predefined network identifiers, a connection request to one or more of the access devices for joining one or more of the networks.

Establishing a communication session with one or more of the access devices via one or more of the networks.

Transmitting to one or more of the access device one or more update requests for one or more update packages.

Receiving one or more of the update packages from one or more of the access devices.

Applying one or more of the received update packages.

According to a fourth aspect of the present invention there is provided a device for downloading data from an access device using predefined network configuration, comprising one or more network interfaces for connecting to one or more networks, and one or more processors adapted to execute a code. The code comprising:

Code instructions to probe one or more networks for one or more predefined network identifiers associated with one or more access devices.

Code instructions to transmit, responsive to detection of one or more of the predefined network identifiers, a connection request to one or more of the access devices for joining one or more of the networks.

Code instructions to establish a communication session with one or more of the access devices via one or more of the networks, Code instructions to transmit to one or more of the access device one or more update requests for one or more update packages.

Code instructions to receive one or more of the update packages from one or more of the access devices Code instructions to apply one or more of the received update packages.

In an optional implementation form of the first, and/or second aspects, an error message is transmitted to one or more of the target devices indicating one or more of the update packages are not available responsive to determination that one or more of the update packages are not available to the access device.

In a further implementation form of the first, second, third and/or fourth aspects, one or more of the predefined network identifiers are stored by the access device.

In a further implementation form of the first, second, third and/or fourth aspects, one or more of the predefined network identifiers are extracted from one or more packets transmitted by one or more of the target devices via the one or more networks and intercepted by the access device.

In an optional implementation form of the first, second, third and/or fourth aspects, access credentials of one or more of the target devices are verified before granting them access to one or more of the networks.

In a further implementation form of the first, second, third and/or fourth aspects, the access credentials comprise a one-time password (OTP) generated using a shared secret available to one or more of the target devices and the access device.

In an optional implementation form of the first, second, third and/or fourth aspects, one or more of the update packages are signed using one or more encryption keys.

In an optional implementation form of the first, and/or second aspects, one or more of the update packages are fetched from one or more remote servers.

In an optional implementation form of the first, and/or second aspects, one or more update services which are provided by the access device are published via the one or more networks.

In a further implementation form of the first, second, third and/or fourth aspects, one or more of the predefined network identifiers comprise a network ID of the one or more network.

In a further implementation form of the first, second, third and/or fourth aspects, one or more of the predefined network identifiers comprise a device identifier of the access device.

In a further implementation form of the first, second, third and/or fourth aspects, one or more of the predefined network identifiers of one or more of the target devices is extracted from factory configuration of the one or more target devices.

In a further implementation form of the first, second, third and/or fourth aspects, one or more of the update packages comprise configuration data for configuring the one or more target devices.

In a further implementation form of the first, second, third and/or fourth aspects, one or more of the update packages comprise update data for updating one or more software packages of the one or more target devices.

In a further implementation form of the third, and/or fourth aspects, the probing is periodic.

In a further implementation form of the third, and/or fourth aspects, the probing is initiated responsive to a probe instruction.

In a further implementation form of the third, and/or fourth aspects, one or more of the predefined network identifiers are stored by the target device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
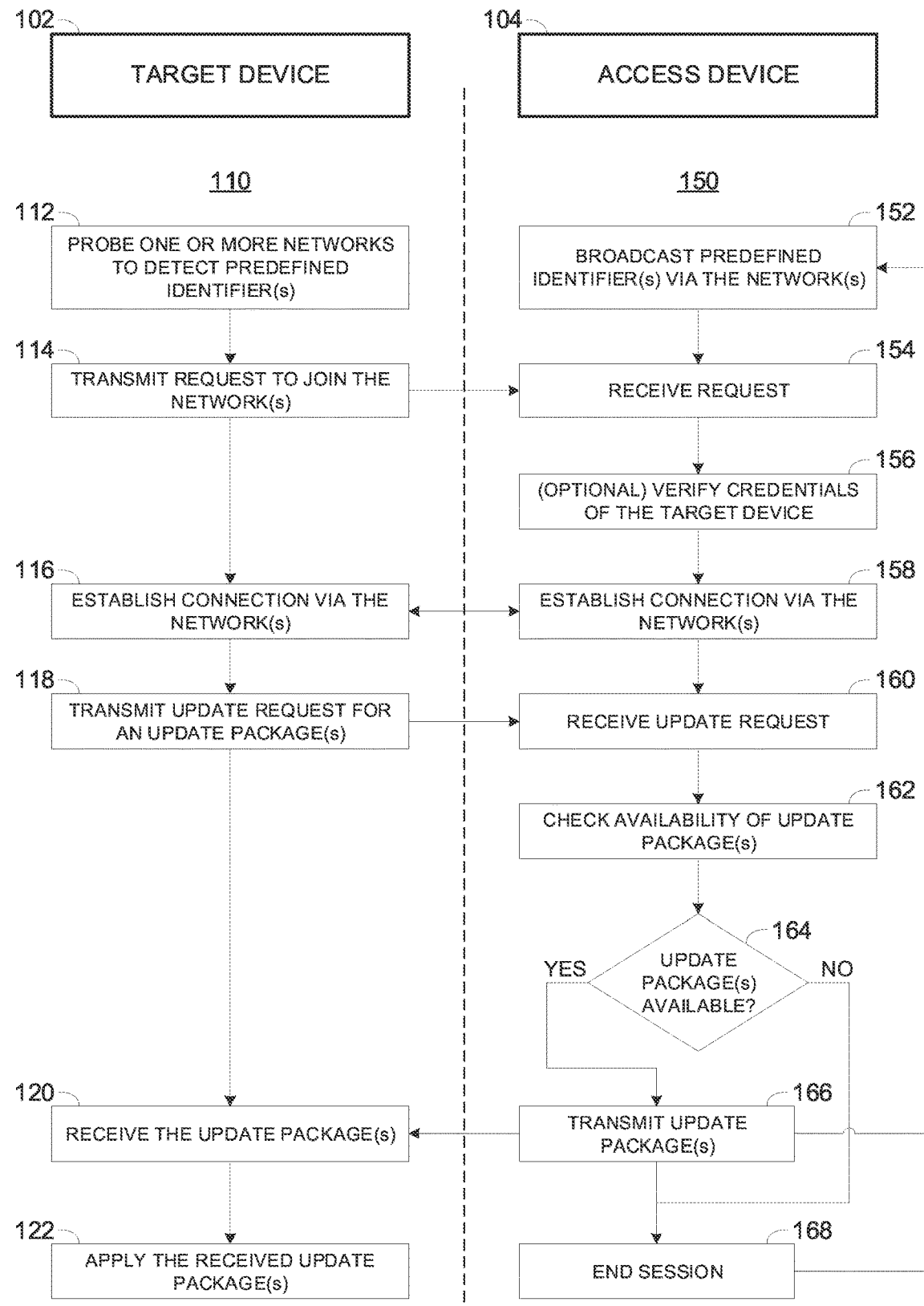
FIG. 1A and FIG. 1B present flowcharts of exemplary processes of updating a device connected to a network using predefined network configuration parameters, according to some embodiments of the present invention.

The present invention relates, in some embodiments thereof, to updating devices connected to networks and, more specifically, but not exclusively, to using predefined network configuration parameters for configuring and/or updating devices which are typically disconnected from the network.

Devices deployed to carry out one or more tasks, missions, applications and/or the like may need to be updated, i.e., have one or more of their configuration parameters, operation modes, software, firmware, hardware and/or the like updated post deployment, for example, after first deployed and/or one or more time during their operational deployment.

Such devices may comprise, for example, disconnected devices which are typically disconnected from the network. However, while typically disconnected, such devices may be adapted to connect, periodically and/or on-command, to one or more networks in order to check for available updates, interchangeably designated update packages. In another example, such devices may comprise network connected devices, for example, a network equipment (e.g., router, access point, range extender, etc.), a smart appliance (e.g., Smart TV, smart home device, etc.), which are deployed for connecting to one or more networks but need to be configured accordingly after deployed for the first time and/or have after reset to their default network settings (parameters).

In particular, such devices may be able to establish network connectivity using predefined network settings, designated predefined network identifiers hereinafter, for example, factory network settings, hardcoded network parameters and/or the like which may identify a network, a subnet, a destination network node, the target device itself, and/or the like. However, these devices may be unable to self-configure their network parameters in order to adapt and connect to networks having different network parameters and may therefore be unable to check and receive updates to their configuration, operation mode, software, firmware, hardware, and/or the like.

For example, one or more wireless devices, for example, disconnected devices, such as for example, an IoT device, a control unit, and/or the like deployed for one or more applications, for example, agriculture, industrial, commercial, public safety and/or the like may be adapted to connect to a wireless network identified by a certain predefined network identifier (ID), for example, a Service Set Identifier (SSID), and/or the like. In another example, one or more wired and/or wireless devices may be adapted to set their network identifier, for example, an Internet Protocol (IP) subnet, and/or the like to a certain predefined network identifier. In another example, one or more wired and/or wireless devices may be adapted to search for one or more network nodes, designated access devices herein after, having certain predefined network identifiers which may inform them of available updates and deliver them.

According to some embodiments of the present invention, there are provided methods, systems and computer program products for configuring and/or updating configuration, software, firmware, and/or hardware of one or more devices, designated target devices hereinafter, which may connect to one or more networks using predefined network configuration parameters, for example, factory network settings, hardcoded network parameters and/or the like.

One or more access devices adapted to distribute one or more updates (update packages) to one or more target devices may be adapted to setup, establish, and/or connect to one or more networks which are configured according to the predefined network parameters used by the target device(s) in order to connect to the target device(s) and establish a communications session with it in order to receive update requests and deliver requested update packages.

As stated herein before, the predefined network identifiers may comprise one or more predefined networks identifiers, for example, a network ID, a network address, a network segment defined by a network address range (subnet), a device name, and/or the like. For example, a certain access device may establish a wireless network having a network ID (SSID) which is predefined for one or more target devices to probe in an attempt to connect and check for available updates. In another example, a certain access device may connect to a wired network hosting one or more target devices each using one or more predefined network identifiers, for example, a predefined network identifier (e.g. IP address), a predefined subnet (IP network range), and/or the like. In such a case the access device may automatically adjust, define, and/or set its network configuration parameters according to the predefined network identifiers used by the target devices to establish a connection and a communication session with the target devices.

One or more access devices may locally store the predefined network identifier(s) used by the target device(s) and/or obtain them from one or more databases, services, and/or the like.

However, optionally, the access device may probe the network to which the target device(s) is connected in order to detect the predefined network identifier(s) used by the target device(s) and automatically adapt its own network parameters accordingly in order to establish a connection with the target device(s). For example, assuming one or more wireless target devices transmit requests to join a wireless network having a certain network ID (SSID), an access device probing the wireless medium may intercept one or more of the requests and extract the certain network ID. The access device may then adjust its network settings to establish, setup, and/or create a wireless network having the certain network ID such that the wireless target device(s) may connect to the certain wireless network and connect to the access device.

Optionally, the access device may establish a secure connection with one or more of the target devices by employing one or more security schemes, for example, (WEP), Wi-Fi Protected Access (WPA), and/or the like which may be based on one or more encryption schemes, and/or algorithms, for example, Pre-shared Shared Key (PSK) based security protocols. In such embodiments, the access device may first verify access credentials of one or more target devices before granting them access to the network and/or to the access device.

After establishing a session with the access device, a target device may request and/or check for one or more available updates and if available, the access device may deliver them to the requesting target device which may apply them to update its configuration parameters, operation modes, software, firmware, hardware and/or the like.

Optionally, the access device may publish one or more update services it supports to inform target devices of availability of such update services.

Optionally, the access device may be adapted to encrypt one or more of the update packages transmitted to one or more of the target devices in order to increase their immunity to malicious interception, attack, and/or compromise thus increasing safety, security, and/or privacy of the transmitted update package(s).

Optionally, the access device may be adapted to sign one or more of the update packages transmitted to one or more of the target devices to enable the target device(s) to verify an origin of the update package(s).

Connecting to target devices using their predefined (network) identifiers in order to provide them with one or more updates may present significant advantages compared to existing update methods and systems.

First, most if not all existing update methods rely on manually adjusting the network identifier(s) (network settings) of each target device in order to enable it to establish connection with the access device to explore available updates. Such manual configuration may be highly tedious, time consuming, and prone to human errors and thus highly ineffective. In contrast, using an access device adapted to automatically adjust its network connection according to the predefined network identifier(s) (network settings) defined by default for each target device may eliminate any need for manual labor and/or intervention thus significantly reducing update effort, time, and/or complexity. In addition, manually adjusting the network settings of target devices to establish a connection with the access device may require technical skill and/or expertise (e.g., in networking, device handling, etc.) thus forcing the configuration and/or update process to be conducted by expert users which may significantly complicate the process and/or increase its cost, time, and/or effort.

Moreover, adapting the access device to automatically adjust its network connection according to the predefined network identifier(s) of the target devices may significantly increase scalability of updating multiple target devices compared to manual configuration of the target devices where each target device needs to be manually configured. For example, an access device may automatically connect to a network hosting a plurality of target devices, for example, a wireless network to which a plurality of agriculture IoT devices are connected and serve updates to these plurality of IoT devices, optionally simultaneously. Moreover, the access device may be mounted on a mobile vehicle (e.g., cart, cart, drone, etc.) and dynamically moved through one or more areas in which target devices are deployed and connect to them when in range to serve them with requested updates. Manually configuring the network settings of such a multitude of target devices is obviously impractical, ineffective and thus infeasible.

Furthermore, adapting the access device to probe the network and inspect, extract and/or intercept the predefined network identifiers(s) used by one or more of the target device, may release the access device from the need to obtain, store and/or become familiar in advance with the predefined network identifiers(s) thus further increasing scalability, and/or case of use of the access device for updating target devices since there is no need for prior, in advance configuration of the access device.

In addition, establishing a secure connection with the target device by verifying the access credentials of the target device(s) may significantly increase immunity of the access device and/or connected target devices to network based cyberattacks initiated via the network by one or more malicious devices fraudulently connecting to the network.

Also, adapting the access device to sign the update packages may enable the target device(s) to verify that the update package(s) originate from the access device rather than from a potentially malicious source and are therefore genuine, valid, and/or reliable.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
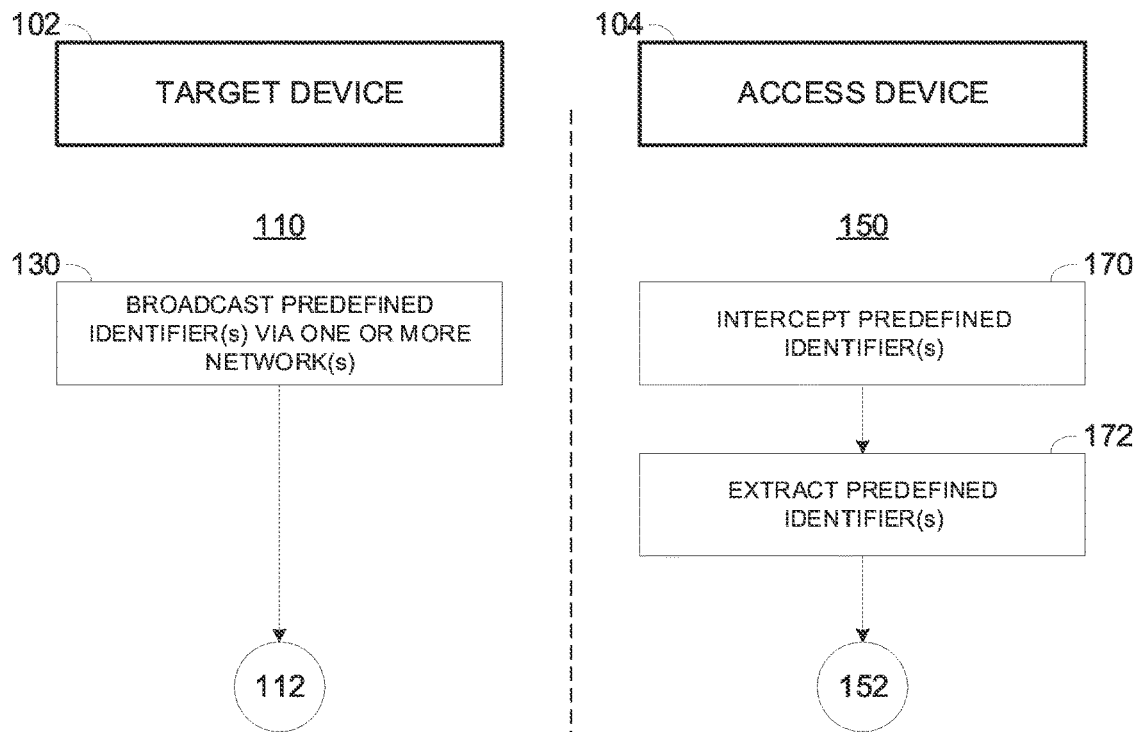

Referring now to the drawings, FIG. 1A and FIG. 1B present flowcharts of exemplary processes of updating a device connected to a network using predefined network configuration parameters, according to some embodiments of the present invention.

An exemplary process 110, shown in FIG. 1A, may be executed by a target device 102 to update its configuration, software, firmware, and/or hardware by connecting to an access device 104 via a network to obtain one or more update packages.

The target device 102 may be, for example, a disconnected device which is deployed to execute one or more actions, operations, tasks, and/or the like while typically disconnected from the network. However, while typically disconnected, the target device 102 may be adapted to periodically and/or on command connect to one or more networks in order to check for updates to its configuration, software, firmware, and/or hardware and obtain such update packages if available. In another example, the target device 102 may be a network connected device which is deployed for the first time and needs to be configured with deployment specific configuration for connecting to one or more networks.

Moreover, the target devices 102 may be incapable of self-configuring their network settings to enable them to connect and communicate with the access device 104. The target devices 102 may therefore attempt to connect to the network using predefined network configuration, parameters, and/or settings, collectively designated predefined network configuration, for example, factory settings and/or the like.

The access device 104 may therefore need to adapt, configure, and/or select its own network settings (parameters) according to the predefined network identifiers used by the target device 102 in order to successfully establish a communication session with the target device 102.

After establishing the communication session with the access device 104 and receiving the requested update package(s), the target device 102 may apply the received update package(s) to update its configuration, software, firmware, and/or hardware.

An exemplary process 150 which is complementary to the process 110 may be executed by the access device 104 in order to establish a communication session with the target device 102 and provide one or more update packages requested by the target device 102.

Figure 2:
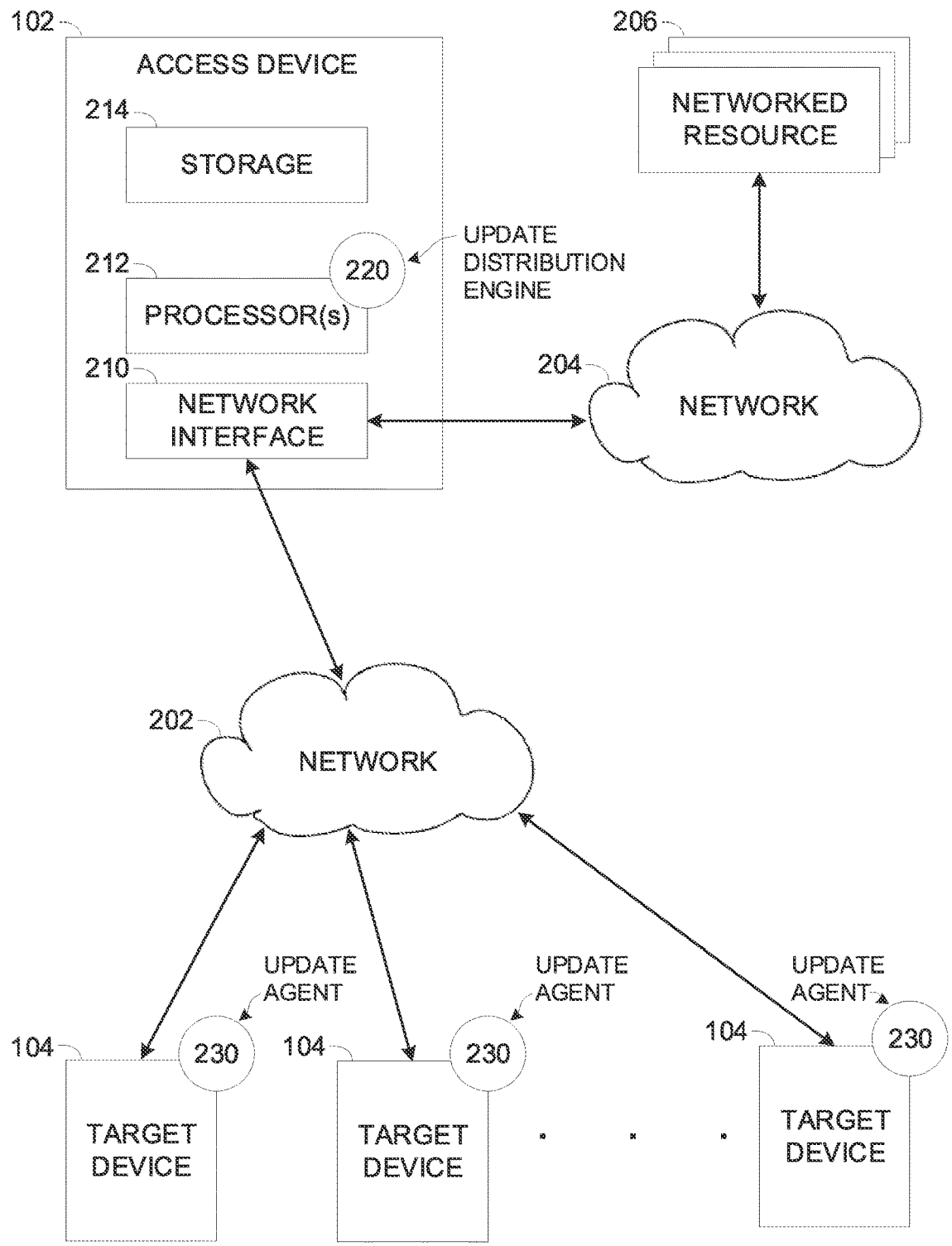
FIG. 2 is a schematic illustration of an exemplary system for updating one or more devices connected to one or more networks using predefined network configuration parameters, according to some embodiments of the present invention.

Reference is also made to FIG. 2, which is a schematic illustration of an exemplary system for updating one or more devices connected to one or more networks using predefined network configuration parameters.

One or more target devices 102, for example, a smart appliance, an Internet of Things (IoT) device, a sensor, a control unit, and/or the like may connect to an access device 204 via a network 202 comprising one or more wired and/or wireless networks, for example, a Local Area Network (LAN), a Wireless LAN (WLAN, e.g., Wi-Fi, etc.), a Radio Frequency (RF) network, (e.g., ZigBee, etc.), and/or the like.

One or more of the target devices 102 may be disconnected devices, for example, a control unit (e.g., agriculture control, industrial control, traffic control, etc.), a sensor, and/or the like which are disconnected from the network as they do not need network connectivity for their normal operation. However, while they may be typically disconnected from the network, such disconnected target devices 102 may comprise one or more network interfaces through which they may connect to the one or more access devices 104 via the network 202 in order to check for and potentially obtain one or more update packages for updating their configuration, software, firmware, and/or hardware.

In another example, one or more of the target devices 102 may be a network connected device, for example, a network equipment (e.g., router, access point, etc.), a smart appliance, and/or the like which are deployed for the first time and/or are reset to their default configuration and therefore need to be configured with deployment specific network configuration parameters for connecting to one or more networks.

The access device 104, for example, a device, an apparatus, a system, a server, a computing node, and/or the like may be adapted to connect to one or more of the target devices 102 requesting one or more updates (update packages) to provide, distribute, and/or deliver the requested update package(s) to the requesting target devices 102.

As stated herein before, the target devices 102 may be incapable of self-configuring their network settings to enable them to connect and communicate with the access device 104 via the network 202. The target devices 102 may therefore use predefined network identifiers, for example, factory network settings, hard-coded network parameters, and/or the like for connecting to the network 202.

The access device 104 may comprise a network interface 210 for connecting to one or more networks, a processor(s) 212 for executing the process 150 and a storage 214 for storing data and/or code instructions (program store).

The network interface 210 may include one or more wired and/or wireless network interfaces for connecting to the network 202 to enable the access device 104 to communicate with one or more target devices 102.

Moreover, via the network interface 210, the access device 104 may optionally connect to another network 204 comprising one or more wired and/or wireless networks, for example, a LAN, a Wide Area Network (WAN), a Metropolitan Area Network (MAN), a cellular network, the internet and/or the like to communicate with one or more remote networked resources 206, for example, a server, a storage server, a data center, a database, a cloud service, and/or the like.

The processor(s) 212, homogeneous or heterogeneous, may include one or more processing nodes and/or cores arranged for parallel processing, as clusters and/or as one or more multi-core processor(s). The storage 214 may include one or more non-transitory persistent storage devices, for example, a ROM, a Flash array, a Solid State Drive (SSD), a hard drive (HDD) and/or the like. The storage 214 may also include one or more volatile memory devices, for example, a RAM component, a cache and/or the like.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212.

Additionally and/or alternatively, the processor(s) 212 may include, integrate and/or utilize one or more hardware modules available in the utilities detection system 200, for example, a circuit, a component, an Integrated Circuit (IC), an Application Specific IC (ASIC), a Field Programmable Gate Array (FPGA), a Digital Signals Processor (DSP), a Graphic Processing Unit (GPU), a network processor, and/or the like.

The processor(s) 212 may therefore execute one or more functional modules, which may be utilized by one or more software modules, one or more of the hardware modules and/or a combination thereof. For example, the processor(s) 212 may execute an update distribution engine 220 for executing the process 150 to distribute, deliver and/or otherwise provide one or more update packages to one or more target devices 102.

Optionally, the access device 104, specifically the update distribution engine 220 may be provided, executed and/or utilized at least partially by one or more cloud computing services accessible to the target devices 102 via the network 202, for example, Infrastructure as a Service (IaaS), Platform as a Service (PaaS), Software as a Service (Saas), and/or the like provided by one or more cloud services, cloud infrastructures, and/or the like such as, for example, Google Cloud, Microsoft Azure, Amazon Web Service (AWS) and Elastic Compute Cloud (EC2), IBM Cloud, and/or the like.

Each of the target devices 102 may comprise computing resources which may execute one or more functional modules utilized by one or more software modules executed by one or more processors of the respective target device 102, by one or more hardware modules available in the respective target device 102 and/or a combination thereof. In particular, each target device 102 may execute an update agent 230 for executing the process 110 to check for available updates to its configuration, software, firmware, and/or hardware, receive such updates and apply them.

For brevity, the processes 110 and 150 are described for execution by a single target device 102 and a single access device 104 respectively. This, however, should not be construed as limiting since, as may become apparent to a person skilled in the art, the process 110 may be executed by target devices 102 to apply update packages to their respective configuration, software, firmware, and/or hardware. Moreover, the process 150 may be scaled, expanded and/or duplicated for multiple access devices 104 for distributing requested update packages to a plurality of target devices 102.

Also for brevity, the processes 110 and 150 describe a single network 202 through which the target device 102 and the access device 104 establish a connection and a communication session. This, however, should not be construed as limiting since the target device 102 may connect to one or more access devices 104 via multiple networks such as the network 202.

As shown at 112, the process 110 starts with the target device 102 probing the network 202, for example, a wireless network and/or a wired network, in an attempt to detect one or more predefined network identifiers identifying the access device 104 in the network 202.

The predefined network identifiers may comprise for example, factory network settings, hard-coded network parameters, and/or the like extracted, for example, from factory configuration data which may be locally stored in the target device 102, for example, in a storage such as the storage 214.

The target device 102 may be configured to probe and search the network 202 in an attempt to detect the predefined network identifier(s) according to one or more probe timing parameters. For example, according to one or more probe timing parameters, the target device 102 may probe the network 202 periodically, for example, once a minute, once an hour, once a day at a predefined timing (e.g., hour, minute, etc.), once a week at a predefined timing, and/or the like. In another example, according to one or more probe timing parameters, the target device 102 may be adapted to initiate probing the network 202 in response to one or more probe instructions, for example, detecting activation of a control switch, button, and/or the like, detecting a probe instruction received via one or more control interfaces of the target device 102, and/or the like.

Moreover, the probe timing parameters may further define a time interval during which the target device 102 probes the network 202 in search of the predefined network identifier(s), for example, 30 seconds, one minute, and/or the like.

The probe timing parameters may be defined in advance and/or dynamically according to one or more operational parameters of the target device 102, for example, power consuming of probing transmission, capacity of a battery powering the target device 102, a criticality of updates to the target device 102, an application of the target device 102, and/or the like. For example, a low end battery powered IoT device 102 may be configured to probe of the network 202 on rare occasions and for a short time interval in order to preserve power. In another example, a mission critical device 102 may be configured to frequently probe the network 202 in order to ensure that the target device 102 is constantly updated with the most recent released update(s).

As shown at 152, the process 150 starts with the access device 104 broadcasting, over the network 202, one or more of the predefined network identifier(s) identifying the access device 104 in the network 202.

In particular, the access device 104 may automatically adapt, configure, and/or select its network settings (parameters) according to the predefined network identifier(s) used by the target device 102.

Steps 112 and 152 may be asynchronous to each other as they may be conducted independently of each other by the target device 102 and the access device 104 respectively. However, obviously the target device 102 probing the network 202 may only detect the predefined network identifier(s) after the access device 104 starts broadcasting them over the network 202.

Moreover, the target device 102 may be able to intercept and detect the predefined network identifier(s) broadcasted by the access device 104 when physical connection is made between the target device 102 and the access device 104. For example, assuming the network 202 comprises a wireless network, the target device 102 may intercept one or more network packets comprising the predefined network identifier(s) broadcasted by the access device 104 when the target device 102 is within the transmission range of the access device 104. In another example, assuming the network 202 comprises a wired network, the target device 102 may intercept one or more network packets comprising the predefined network identifier(s) which are broadcasted by the access device 104 when the target device 102 are both physically connected to the wired network and optionally share the same network segment.

For example, assuming one or more agriculture control units (target devices 102), for example, irrigation valves controllers having wireless network connectivity are deployed in a certain area, for example, a crop field. An access device 104 hosting a wireless network may be dynamically moved, for example, mounted on a cart, a drone, and/or the like through, over, near, and/or in close proximity to the crop filed. As such, when a respective one of the irrigation valves controllers is within transmission range of the dynamically moving access device 204, the respective irrigation valves controller may detect the predefined network identifier(s) indicative of the wireless network hosted by the dynamic access device 104, for example, a network identifier (ID), and/or the like.

In another example, assuming one or more network equipment units, for example, a router, an access point, a range extender, and/or the like are deployed and connected to a certain wired network for the first time and/or are reset to default configuration such that their network configuration parameters are set to default factory settings. An access device 104 may be connected, at least temporarily, to the network 202 for updating the network equipment units. As such, once the access device 104 is connected to the network 202, the network equipment units may detect the predefined network identifier(s) indicative of the access device 104 and identifying it in the network 202.

The predefined network identifier(s) may be predefined according to one or more attributes, parameters, features, and/or characteristics of the network 202, the target device 102, the access device 104, network protocols employed by the target device 102 and/or the access device 104, and/or a combination thereof.

For example, assuming the network 202 is a wireless network, the predefined network identifier(s) may comprise a network ID, for example, an SSID broadcasted by the access device 104 and searched for (probed) by the target device 102. In another example, assuming the target device 102 and the access device 104 employ L3 protocols in a wired or wireless network 202, the predefined network identifier(s) may comprise an address, for example, an Internet Protocol (IP) address, an IP address range (subnet, segment), and/or the like assigned to the access device 104 to uniquely identify it in the network 202. In another example, assuming the target device 102 and the access device 104 employ L2 protocols in a wired or wireless network 202, the predefined network identifier(s) may comprise an address, for example, a Media Access Control (MAC) address of the access device 104 which is unique to the access device 104.

The access device 104 may apply one or more methods to obtain the predefined network identifier(s). For example, one or more of the predefined network identifier(s) may be locally stored by the access device 104, for example, in the storage 214. In another example, the access device 104 may communicate with one or more of the remote networked resources 106 to retrieve and/or receive one or more of the predefined network identifier(s).

Optionally, as shown in FIG. 1B, the access device 104 may extract one or more of the predefined network identifier(s) from one or more packets transmitted by the target device 102 via the network 202 which are intercepted by the access device 104. This means that the target device 102 may be adapted to transmit one or more predefined network identifier(s), for example, transmit one or more network packets comprising and/or indicating one or more of the predefined network identifier(s) such that the access device 104 may intercept these packets and extract the predefined network identifier(s).

As shown at 130, which is a step preceding step 112, the process 110 may start with the target device 102 broadcasting, via the network 202, one or more predefined network identifiers identifying a requested access device 104 in the network 202. In particular, the target device 102 may transmit one or more packets comprising and/or advertising the predefined network identifier(s) which may be indicative of one or more of an identifier of the requested access device 104, an identifier of the target device 102, and/or the like.

As shown at 170, which is a step preceding step 152, the process 150 may start with the access device 104 intercepting one or more of the packets transmitted by the target device 102.

As shown at 172, the access device 104 may extract the predefined network identifier(s) from the intercepted packet(s).

From this point, after obtaining the network identifier(s) from the target device 102, the process 150 may branch to step 152 in which the access device 104 may broadcast the intercepted network identifier(s). Complementary, the process 110 may branch to step 112 in which the target device 102 may probe the network 202 in search of the network identifier(s).

For example, assuming the network 202 is a wireless network, as part of the probing, the target device 102 may be adapted to transmit one or more packets indicative that the target device 102 is searching for a certain network ID, for example, UPDATE_NETWORK_123. Moreover, the access device 104 may be adapted to probe the network 202 and intercept and/or inspect one or more of the packets transmitted by the target device 102. The access device 104 may extract the certain network ID searched by the target device 102 and may automatically adapt itself to host a wireless network designated with the certain network ID, i.e., UPDATE_NETWORK_123. As a result, the target device 102, still probing the network 202, may detect the network UPDATE_NETWORK_123.

In another example, as part of the probing, the target device 102 may be adapted to transmit via the network 202, whether wired or wireless, one or more packets publishing a predefined IP address of the target device 102, for example, a factory default IP address. In another example, target device 102 may be adapted to transmit via the network 202 one or more packets indicating an IP address of a destination device which is a predefined IP address. For example, assuming a certain network equipment target device 102, for example, a router, an access point, and/or the like is deployed to connect to a certain network, specifically a subnet having IP address 192.9.200.0. However, the default network parameters of the network equipment target device 102 define its IP address to be 192.168.0.1 such that obviously the network equipment target device 102 is unable to connect to the certain network. In such case, the access device 104 may connect to the network equipment target device 102 via a network 202 having an address range (subnet) mapping the IP address of the network equipment target device 102, for example, 192.168.0.0. the network equipment target device 102 probing the network 202, may therefore be able to connect to the network 202 and detect the access device 104 by its IP address, for example, 192.168.0.100 which may be another predefined network identifier defined and used by the network equipment target device 102.

In another example, the target device 102 may be adapted to transmit via the network 202 one or more packets indicating its subnet (e.g., IP address range), which may is a predefined subnet. The access device 104 connected to the network 202 may intercept one or more of these packets and extract one or more of the predefined network identifier(s), for example, the predefined IP of the target device 102, the predefined IP of the destination device, the predefined subnet, and/or the like. The access device 104 may then automatically adapt and/or configure itself according to the extracted predefined network identifier(s), for example, adjust its network configuration parameters to define the predefined IP of the destination device searched by the target device 102, define an IP address within the predefined subnet, and/or the like.

As shown at 114, responsive to detecting the predefined network identifier(s) identifying the access device 104 in the network 202, the target device 102 may transmit to the access device 104 a connection request as known in the art for joining the network 202.

As shown at 154, the access device 104 may receive the connection request transmitted by the target device 102.

As shown at 156, which is an optional step, the access device 104 may verify access credentials of the target device 102, for example, a password, a code, a secret, and/or the like before granting the target device 102 access to the network 202.

Verifying the access credentials of the target device 102 may be done as part of one or more security schemes, policies, and/or protocols applied by the access device 104 to verify secure connection via the network 202 in order to reduce and mitigate risk and/or exposure of the access device 104 to network based cyberattacks.

For example, the access device 104 may apply one or more Pre-shared Shared Key (PSK) based security protocols such as, for example, WPA, WPA-2, and/or the like.

Moreover, in order to further increase its security and prevent malicious attack by a fraudulent device using impersonating as the target device 102 by using the access credentials of the target device 102, the access device 104 may apply a One-time Password security protocol (OTP) in which the access credentials, for example, a password is valid only for a single access.

As such, the target device 102 may generate (initiate) an OTP based on an OTP seed which is derived from a shared secret shared between the target device 102 and the access device 104 thus preventing the use of a secret which is fixed and/or hard-coded and may be thus compromised.

Moreover, the target device 102 may generate an OTP based on the OTP seed and a moving factor, as known in the art, thus ensuring that different access credentials, e.g., password are used for each access and/or connection session established between the target device 102 and the access device 104.

The access device 104 having the shared secret may also generate an OTP based on the OTP seed derived from the shared secret, optionally also applying the moving factor. The access device 104 may therefore compare between its own generated OTP and the OTP (access credentials) received from the target device 102 to verify the OTP accordingly, i.e., in case of a match, the OTP is successfully verified and in case of a no match, the OTP fails to verify.

As shown at 116 and 158, the target device 102 and the access device 104 may establish a connection and a communication session with each other over the network 202.

Optionally, the access device 104 may establish connection and communication session with the target device only after successfully verifying the access credentials used by the target device 102 to connect to the network 202.

Establishing the connection and communication session may be done as known in the art. For example, the target device 102 may be configured to set its IP address to a predefined IP address (predefined network identifier) which is used and reported by the target device 102 in steps 112-114. The access device 104 may be adapted to set its IP address to another IP address within the same subnet (IP address range) of the predefined network identifier of the target device 102 such that they may connect to each other to establish the communication session. In another example, the access device 104 may serve as a Dynamic Host Configuration Protocol (DHCP) server and assign the target device an IP address within a predefined IP address range used in the network 202. In another example, the access device 104 serving as a DHCP server in a wireless network 202 having a predefined network ID (predefined network identifier) may assign the target device an IP address within a predefined IP address range used in the wireless network 202.

As shown at 118, the target device 102 may transmit to the access device 104 one or more update requests for one or more update packages, interchangeably designated updates, for updating configuration, software, firmware, hardware, and/or the like of the target device 102.

For example, one or more update packages may comprise an update to one or more software modules executed by the target device 102, for example, an application, an Operating System (OS), a device driver, and/or the like. In another example, one or more update packages may comprise an update to one or more firmware modules of the target device 102, for example, a boot sequence, a Basic Input/Output System (BIOS), and/or the like. In another example, one or more update packages may comprise an update to one or more hardware modules of the target device 102, for example, an FPGA, a microcode, and/or the like.

However, rather than updating software, firmware, and/or hardware modules of the target device 102, one or more of the update packages may comprise configuration data for updating one or more configuration settings, operation parameters, modes and/or the like of the target device 102, for example, a control directive, a network configuration parameter, an operation timing, and/or the like.

For example, assuming the target device 102 is a network equipment unit, for example, a router deployed and connected to a certain wired network for the first time such that its network configuration parameters are set to default factory settings. In such case the update request issued by the router target device 102 may relate, for example, to updating the network configuration parameters of the router target device 102 to enable it to connect to the certain network.

In another example, assuming the target device 102 is a control unit, for example, an industrial control unit deployed to control operation of one or more industrial systems. In such case the update request issued by the control unit target device 102 may relate, for example, to updating an operation mode, timing, and/or the like of the control unit target device 102 in order to adjust operation of the respective industrial system(s).

The update request issued by the target device 102 may be a general update request directed to receive any update package applicable for the target device 102. However, optionally, the target device 102 may issue one or more update requests pertaining to specific update packages, for example, a software update, a configuration update, and/or the like. One or more update requests may further specify one or more specific update packages, for example, a version of an update package, a time of issue of an update package, and/or the like.

As shown at 160, the access device 104 may receive the update request from the target device 102.

Optionally, the access device 104 may publish via the network 202 one or more update services provided by the access device 104. For example, the access device 104 may publish which types of update packages are supported and/or offered by the access device 104, for example, software update, firmware update, hardware update, network configuration update, operation mode update, and/or the like. In another example, the access device 104 may publish that update packages are available for one or more types (e.g., models, versions, etc.) of target devices 102. In another example, the access device 104 may publish serial numbers of one or more of target devices 102 to which available updates pertain.

The target device 102 may therefore inspect the update services published by the access device 104 and decide accordingly whether to issue an update request and/or which update package to request.

As shown at 162, the access device may check availability of the update package(s) requested by the target device 102.

For example, assuming one or more update packages are locally stored by the access device 104, the access device 104 may check listings of its stored update packages to check whether the requested update package(s) match corresponding stored update package(s).

Optionally, the access device 104 may communicate with one or more of the remote networked resources 206 via the network 204 to check for availability of one or more of the update package(s) requested by the target device 102. In case the requested update package(s) are available at one or more of the remote networked resources 206, the access device 104 may get this update package(s).

As shown at 164, which is a conditional step, responsive to determination that the update package(s) requested by the target device 102 is available to the access device 104, the process 150 may branch to 166. Otherwise, responsive to determination that the update package(s) is not available to the access device 104, the process 150 may branch to 168.

As shown at 166, since it has the requested update package(s) available, the access device 104 may transmit the update package(s) to the target device 102 via the network 202.

Optionally, the access device 104 may sign one or more of the update package(s) transmitted to the target device 102 in order to enable the target device 102 to verify the origin of the update package(s) and ensure that the update package(s) is genuine. The access device 102 may apply one or more methods to sign the update package(s), for example, use one or more encryption keys such as, for example, a symmetric cryptographic key, as asymmetric cryptographic key and/or the like which are shared with the target device 102 as known in the art.

Moreover, the access device 104 may optionally encrypt one or more of the update package(s) transmitted to the target device 102 in order to increase their security, safety, and/or robustness against malicious attacks initiated in attempt to compromise, gain access, and/or maliciously alter contents of the update package(s).

to enable the target device 102 to verify the origin of the update package(s) and ensure that the update package(s) is genuine As shown at 168, the communication session between the access device 104 and the target device 102 may end either after the access devices completes transmitting the requested update package(s) to the target device 102 or since the requested update package(s) is unavailable to the access device 104 and thus cannot be provided to the target device 102.

Optionally, the access device 104 may transmit one or more error messages to the target device 102 indicating that the requested update package(s) is not available to the access device 104 and therefore cannot be delivered to the target device 102.

Optionally, the process 150 may branch back to 152 in order to establish a communication session with one or more other target devices 102 requesting for one or more updates. For example, continuing the example of the irrigation valves controllers target devices 102 deployed in the crop filed, the dynamically moving access device 104 may restart the process 150 as it moves in order to establish communication session with one or more other irrigation valves controllers which enter the transmission range of the dynamic access device 104.

As shown at 120, the target device 102 may receive the update package(s) transmitted via the network 202 by the access device 104.

Optionally, in case the received update package(s) is signed and/or encrypted using one or more encryption keys shared with the access device 104, the target device 102 may verify the signature to verify the update package(s) is genuine and/or decrypt the update package(s) to extract its contents.

Moreover, the access device 104 may optionally encrypt one or more of the update package(s) transmitted to the target device 102 in order to increase their security, safety, and/or robustness against malicious attacks initiated in attempt to compromise, gain access, and/or maliciously alter contents of the update package(s).

As shown at 122, the target device 102 may apply the received update package(s) to update one or more of its software, firmware, hardware, configuration, and/or the like. The methods applied by the target device 102 to apply the update package(s) are known in the art and are beyond the scope of this disclosure.

Figure 3:
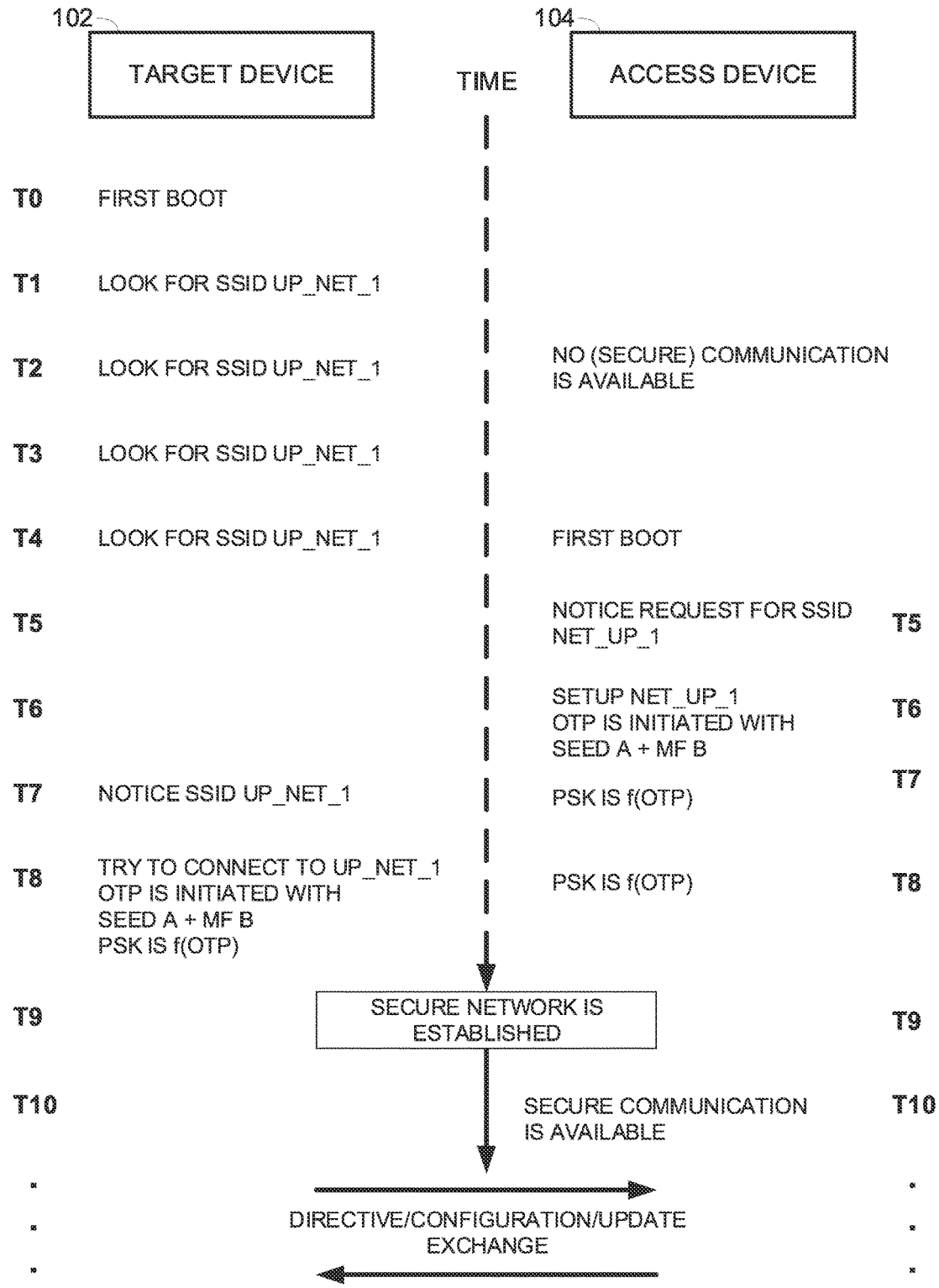
FIG. 3 is an exemplary sequence initiated by a target device using predefined network configuration parameters to connect to an access device via a wireless network, according to some embodiments of the present invention.

Reference is now made to FIG. 3, which is an exemplary sequence initiated by a target device using predefined network configuration parameters to connect to an access device via a wireless network, according to some embodiments of the present invention.

An exemplary sequence 300 may be initiated by a target device such as the target device 102 to receive one or more update packages for updating its software, firmware, hardware, configuration, and/or the like.

The target device 102 may connect to an access device such as the access device 104 via a network such as the network 202, specifically a wireless network, in order to request and receive the update package(s) from the access device 104.

In particular, the target device 102 may use a predefined network identifier, specifically a network ID (e.g., SSID) to connect to the wireless network.

As seen, at time T0, the target device 102 may complete its boot sequence, for example, a first boot. The target device 102 may then start probing the wireless medium, for example, transmit one or more probe network packets, in search of a network 202 having a predefined network identifier, specifically a predefined network ID (SSID), for example, UP_NET_1.

In this exemplary sequence, while the target device 102 may complete its boot at T0, the access device 104 may complete its own boot sequence only at T4.

Therefore, during times T1, T2, and T3, the target device 102 probing the wireless medium may be unable to detect a wireless network 202 UP_NET_1 and may be thus unable to establish a communication session let alone a secure communication session, over the wireless network 202 UP_NET_1.

As seen at time T5, after it completes its boot sequence, the access device 104 may detect (notice) the search requests for the network UP_NET_1 transmitted by the target device 102.

As seen at time T6, in response to detecting the search of the wireless network UP_NET_1 by the target device 102, the access device 104 may adapt, adjust, and/or configure itself to setup and host a wireless network identified by the network ID (SSID) UP_NET_1.

The access device 104 may further initiate (generate) an OTP based on an OTP seed A derived from a shared secret shared between the target device 102 and the access device 104 and further based on a moving factor (MF) B.

As seen at time T7, the target device 102 probing the wireless medium may now detect the network ID (SSID) UP_NET_1 of the wireless network 202 established by the access device 104 which is protected using a PSK based security protocol is based on, i.e., is a function of, the OTP generated by the access device 104.

As seen at time T8, the target device 102 may try to connect to the wireless network UP_NET_1. In particular, since the wireless network UP_NET_1 is protected by the PSK based security protocol, the target device 102 may generate an OTP based on the OTP seed A which is derived from the shared secret shared between the target device 102 and further based on the moving factor (MF) B.

As seen at time T9, the target device 102 may establish a communication connection, specifically a secure network connection, with the access device 104 over the wireless network 202 UP_NET_1.

As seen at time T10 and onward, the target device 102 and the access device 104 may communicate with each other and exchange data, in particular, the target device 102 may request for one or more updates to its software, firmware, hardware, configuration, and/or the like which may be provided in response by the access device 104.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms target device, access device, network, and network protocols are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of distributing data to target devices using predefined network configuration, comprising:
using at least one processor of an access device for:
broadcasting at least one predefined network identifier via at least one network accessible to at least one target device, the at least one predefined network identifier identifies the access device in the at least one network;
receiving a connection request from the at least one target device to join the at least one network according to the at least one predefined network identifier;
establishing a communication session with the at least one target device via the at least one network;
receiving at least one update request for at least one update package from the at least one target device; and
transmitting, responsive to determination that the at least one update package is available to the access device, the at least one update package to the at least one target device which is adapted to apply the received at least one update package;
wherein the at least one target device is a device that normally operates disconnected from any network and connects to the at least one network periodically to check for updates.

2. The method of claim 1, further comprising transmitting an error message to the at least one target device indicating the at least one update package is not available responsive to determination that the at least one update package is not available to the access device.

3. The method of claim 1, wherein the at least one predefined network identifier is stored by the access device.

4. The method of claim 1, wherein the at least one predefined network identifier is extracted from at least one packet transmitted by the at least one target device via the at least one network and intercepted by the access device.

5. The method of claim 1, further comprising verifying access credentials of the at least one target device before granting it access to the at least one network.

6. The method of claim 5, wherein the access credentials comprise a one-time password (OTP) generated using a shared secret available to the at least one target device and the access device.

7. The method of claim 1, further comprising signing the at least one update package using at least one encryption key.

8. The method of claim 1, further comprising fetching the at least one update package from at least one remote server.

9. The method of claim 1, further comprising publishing, via the at least one network, at least one update service provided by the access device.

10. The method of claim 1, wherein the at least one predefined network identifier comprises a network ID of the at least one network.

11. The method of claim 1, wherein the at least one predefined network identifier comprises a device identifier of the access device.

12. The method of claim 1, wherein the at least one predefined network identifier of the at least one target device is extracted from factory configuration of the at least one target device.

13. The method of claim 1, wherein the at least one update package comprises configuration data for configuring the at least one target device.

14. The method of claim 1, wherein the at least one update package comprises update data for updating at least one software package of the at least one target device.

15. The method of claim 1, wherein the at least one predefined network identifier is based on default factory settings or hard-coded network parameters of the at least one target device, and wherein the access device adapts its network settings to match the at least one predefined network identifier.

16. The method of claim 1, wherein the access device automatically adapts its network settings to match the at least one predefined network identifier probed or broadcasted by the at least one target device.

17. An access device for distributing data to target devices using predefined network configuration, comprising:
at least one network interface for connecting to at least one network; and
at least one processor adapted to execute a code, the code comprising:
code instructions to broadcast at least one predefined network identifier via at least one network accessible to at least one target device, the at least one predefined network identifier identifies the access device in the at least one network;

code instructions to receive a connection request from the at least one target device to join the at least one network according to the at least one predefined network identifier;

code instructions to establish a communication session with the at least one target device via the at least one network;

code instructions to receive at least one update request for at least one update package from the at least one target device; and code instructions to transmit, responsive to determination that the at least one update package is available to the access device, transmit the at least one update package to the at least one target device which is adapted to apply the received at least one update package;

wherein the at least one target device is a device that normally operates disconnected from any network and connects to the at least one network periodically to check for updates.

18. A method of downloading data from an access device using predefined network configuration, comprising:

using at least one processor of a target device for:

probing at least one network for at least one predefined network identifier associated with at least one access device;

transmitting, responsive to detection of the at least one predefined network identifier, a connection request to the at least one access device for joining the at least one network;

establishing a communication session with the at least one access device via the at least one network;

transmitting to the at least one access device at least one update request for at least one update package;

receiving the at least one update package from the at least one access device; and applying the received at least one update package;

wherein the at least one target device is a device that normally operates disconnected from any network and connects to the at least one network periodically to check for updates.

19. The method of claim 18, wherein the probing is periodic.

20. The method of claim 18, wherein the probing is initiated responsive to a probe instruction.

21. The method of claim 18, wherein the at least one predefined network identifier is stored by the target device.

22. A device for downloading data from an access device using predefined network configuration, comprising:

at least one network interface for connecting to at least one network; and at least one processor adapted to execute a code, the code comprising:

code instructions to probe at least one network for at least one predefined network identifier associated with at least one access device;

code instructions to transmit, responsive to detection of the at least one predefined network identifier, a connection request to the at least one access device for joining the at least one network;

code instructions to establish a communication session with the at least one access device via the at least one network;

code instructions to transmit to the at least one access device at least one update request for at least one update package;

code instructions to receive the at least one update package from the at least one access device; and code instructions to apply the received at least one update package;

wherein the at least one target device is a device that normally operates disconnected from any network and connects to the at least one network periodically to check for updates.

* * * * *